United States Patent [19]

Cathell

[11] Patent Number: 4,720,775
[45] Date of Patent: Jan. 19, 1988

[54] INVERTER HAVING SATURATING CURRENT TRANSFORMER CORE FOR MAINTAINING INVERTER CURRENT ABOVE MINIMUM PREDETERMINED LEVEL

[75] Inventor: Frank Cathell, Descanso, Calif.

[73] Assignee: Qualidyne Systems, Inc., San Diego, Calif.

[21] Appl. No.: 870,330

[22] Filed: Jun. 3, 1986

[51] Int. Cl.$^4$ .............................................. H02M 3/24
[52] U.S. Cl. ..................................... 363/15; 323/226; 363/56; 363/97
[58] Field of Search ........................ 323/223, 226, 220; 363/15, 56, 80, 97; 361/57

[56] References Cited

U.S. PATENT DOCUMENTS 3,846,675 11/1974 Shimp .................................... 361/95

FOREIGN PATENT DOCUMENTS

| 133980 | 10/1981 | Japan | 323/285 |
| 64515 | 4/1983 | Japan | 323/226 |
| 222781 | 12/1983 | Japan | 323/223 |
| 215969 | 12/1983 | Japan | 323/223 |

OTHER PUBLICATIONS

Electronics, "Transistor Replaces Bleeder and Regulates Power Supply", vol. 41, No. 2, pp. 70, 71, Jan. 22, 1968.

Primary Examiner—William H. Beha, Jr.
Attorney, Agent, or Firm—Lowe, Price, LeBlanc, Becker & Shur

[57] ABSTRACT

A high frequency switching regulator drives plural loads by way of an output transformer. The transformer includes plural secondary windings connected to plural loads. One of the secondary windings is connected to a main output channel including a circuit for maintaining the current in the main channel above a predetermined minimum required for proper voltage regulation of the other channels. The circuit includes a current transformer in a line of the main channel. The current transformer contains a saturating core that saturates in response to a main channel current slightly above the predetermined minimum main channel current. An impedance responsive to current in the current transformer loads the main channel so that the main channel current is never less than the predetermined value regardless of the impedance between load terminals of the main channel. This assures proper inverter operation to maintain full voltage regulation of the other output channels.

22 Claims, 2 Drawing Figures

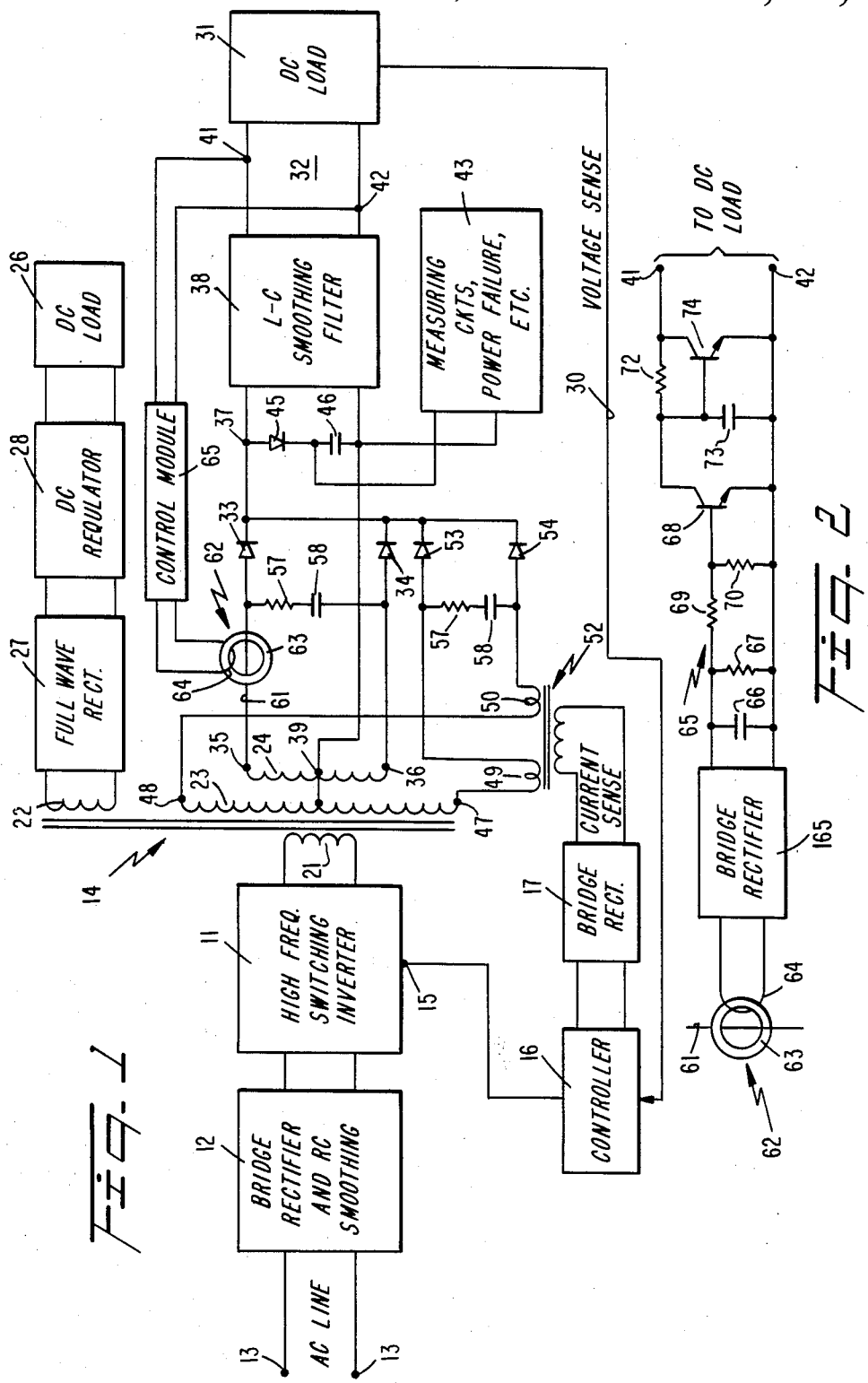

INVERTER HAVING SATURATING CURRENT TRANSFORMER CORE FOR MAINTAINING INVERTER CURRENT ABOVE MINIMUM PREDETERMINED LEVEL

FIELD OF INVENTION

The present invention relates generally to inverters for driving plural loads wherein the inverter must supply a minimum amount of power to an output transformer thereof for proper operation, and more particularly, to such an inverter wherein the minimum amount of output power of the inverter is maintained by sensing current in a main output channel of the inverter with a current transformer having a saturating core which controls a load of the main channel.

BACKGROUND ART

One type of power supply system includes a high frequency inverter having DC power supplied to it by a rectifier, in turn driven by an AC power line source. The inverter includes an output transformer having plural secondary windings, each of which drives a separate load. One of the loads is a main load while the other loads normally draw considerably less current than the main load and are denominated as auxiliary loads. Typically, the load connected to a secondary winding around which a control loop is closed can be considered as the main channel load and the circuitry supplying such a load with current is considered as a main channel.

If the main load current is less than a predetermined value the high frequency inverter does not operate in a manner to enable the auxiliary loads to be regulated. Generally, none of the auxiliary loads draws enough current to enable the inverter to operate in such a manner as to achieve auxiliary load regulation. Proper output regulation of all loads is thus not attained unless the inverter is supplying at least a minimum amount of power to the output transformer thereof. Hence, it is necessary for the main load connected to the secondary windings to draw enough current to cause the inverter to supply at least the predetermined minimum power to the output transformer.

In the past inverters have been maintained at or above the minimum output power thereof required for proper operation by sensing the main channel current and controlling an impedance coupled to the main channel. The prior art devices have typically used bulky current shunts, power resistors or large non-saturating transformers. These prior art devices are beset by problems associated with volume, weight and cost. In addition, the prior art structures cannot handle a wide current range of the main channel without sacrificing sense resolution and/or power dissipation.

It is, accordingly, an object of the present invention to provide a new and improved circuit for controlling the impedance coupled to an inverter of the type which must supply a minimum amount of power to an output transformer for proper operation.

Another object of the invention is to provide a new and improved circuit for monitoring main channel current of an inverter and for causing an impedance in the main channel to vary to maintain the main channel current above a predetermined minimum value required for proper regulation of other channel outputs.

Another object of the invention is to provide a new and improved inverter for driving a main channel output having a current sensor which controls the impedance of the main channel so that the controlled impedance of the main channel always has a relatively high, non-dissipating value except when the main channel current drops below a predetermined minimum value necessary to sustain proper regulator operation.

An additional object of the invention is to provide a new and improved inverter for driving a main channel load wherein a current sensor and impedance for the main channel are arranged so that, in response to the main channel current dropping below a minimum current necessary for proper regulator operation, the impedance controlled by the current sensor varies by an amount just necessary to provide proper compensation for the insufficiency of the main channel current.

A further object of the invention is to provide a new and improved inverter having main channel current sensing and control circuitry with minimum volume and weight requirements, as well as high sense resolution and low power dissipation.

DISCLOSURE OF THE INVENTION

In accordance with the present invention, a system for supplying plural loads comprises a high frequency switching inverter responsive to a DC power supply source. The inverter has an output transformer with plural secondary windings adapted to be connected to the plural loads. For proper voltage regulation of all of the loads the inverter must supply a minimum amount of power to the output transformer. One of the secondary windings is connected to a main output channel while the other secondary windings drive plural loads via auxiliary channels. The main channel includes circuit means responsive to a regulated output voltage of the one secondary winding for supplying current to load terminals of the main channel. The main channel current must be maintained above a predetermined minimum required for the inverter to operate in such a manner as to provide adequate regulation of the auxiliary channels. If the main channel current drops below the predetermined minimum the inverter becomes so lightly loaded that there is an appreciable change in the wave shape generated thereby, whereby the current coupled to the auxiliary channels is so low that the voltage of the auxiliary channels drops to a level that cannot be regulated.

The main channel current must be maintained above the predetermined minimum required for proper auxiliary channel operation by a circuit including a current transformer in a line of the main channel. The current transformer includes a core that saturates in response to a main channel current slightly above the predetermined minimum main channel current. An impedance means respond to current in the current transformer so as to load the main channel so that the main channel current is never less than the predetermined minimum main channel current regardless of the impedance between the main channel load terminals.

Preferably, the current transformer and impedance means are arranged so that as the main channel current drops below the predetermined minimum, the loading of the main channel by the impedance means increases accordingly. It is particularly desirable for the main channel loading by the impedance means to increase in a linear manner with linear current changes of the main channel current to provide high sense resolution for the main channel loading. This desirable result is achieved by circuitry included in the impedance means.

In the preferred embodiment, the main channel includes rectifier means for supplying DC to the load terminals of the main channel. The impedance means for providing the desired result includes a rectifier responsive to an output voltage of the current transformer and circuit means responsive to the rectifier for driving a DC control voltage. Transistor means having output terminals shunting the main channel output terminals is responsive to the DC control voltage so that the impedance of the transistor means between the output terminals thereof is relatively high in response to the main channel current being above the predetermined minimum current. The impedance of the transistor means decreases as the main channel current decreases below the predetermined minimum current. To provide very efficient operation whenever the main channel current is in excess of the predetermined minimum value, the transistor means has a relatively high impedance between the load terminals to effectively prevent dissipation by the impedance means.

The transistor means preferably includes first and second transistors, such that the first transistor has a first emitter collector impedance responsive to the DC control voltage. Thereby, the first emitter collector impedance is relatively low and high in response to the main channel current sensed by the current transformer being respectively above and below the predetermined minimum main line current. The second transistor has a second emitter collector impedance responsive to the first emitter collector impedance so that the second emitter collector impedance is relatively high and low in response to the first emitter collector impedance being respectively low and high. The second emitter collector impedance shunts the main channel load terminals such that the high impedance of the second emitter collector path draws virtually no current from the main channel in response in response to the main channel current being in excess of the predetermined minimum value therefore.

The first transistor includes a control electrode for the first emitter collector impedance. The first emitter collector impedance has a low impedance in response to the control electrode voltage having at least a predetermined value. The current transformer and saturating toroidal core thereof, as well as the circuit means, bias the control electrode to only the predetermined voltage in response to the main channel current sensed by the current transformer being at least equal to the predetermined main channel current. Hence, as the main channel current increases above the predetermined minimum value therefore, the forward bias of the control electrode for the first emitter collector impedance remains constant and does not further load the main channel.

The above and still further objects, features and advantages of the present invention will become apparent upon consideration of the following detailed description of one specific embodiment thereof, especially when taken in conjunction with the accompanying drawing.

BRIEF DESCRIPTION OF DRAWINGS

FIG. 1 is a block diagram of an inverter incorporating the present invention; and FIG. 2 is a circuit diagram of a control module included in the circuit of FIG. 1.

DESCRIPTION OF THE PREFERRED EMBODIMENT

Reference is now made to FIG. 1 of the drawing wherein high frequency switching inverter 11 is illustrated as being responsive to a DC power supply voltage at output terminals of a bridge rectifier and resistor-capacitor smoothing filter network 12, in turn driven by an AC power line source at terminals 13. Inverter 11 includes output transformer 14 and is of the type which must supply a minimum amount of power to transformer 14 for proper output regulation. Such inverters are well-known to those skilled in the art and include a voltage control input terminal 15, responsive to a well-known type of controller 16 which supplies the converter with a control voltage indicative of load conditions, as reflected in the output voltage across DC load 31. An indication of the DC voltage across load 31 is supplied in a known matter as a DC signal to voltage sense line 30 which is coupled to one input of controller 16. As the monitored voltage across load 31 increases and decreases the output power of inverter 11 is respectively decreased and increased by controller 16.

Transformer 14 includes a primary winding 21 and plural secondary windings 22, 23 and 24, coupled to the primary winding by core 25 in the usual manner. Secondary winding 22 is coupled to a relatively light, auxiliary DC load 26 by way of full wave rectifier 27 and DC regulator 28. Additional auxiliary loads, which are usually DC, can be supplied by inverter 11 via additional secondary windings and appropriate circuitry, such as rectifiers and regulators. The current requirements alone of the auxiliary load or loads do not, however, cause inverter 11 to operate properly so as to maintain the regulation thereof.

Main load 31, around which the inverter control loop is closed, normally draws sufficient current from inverter 11 to cause the auxiliary channel(s) to operate properly. Load 31 is connected to main load channel 32, in turn connected to and driven by secondary winding 24. Main load channel 32 includes a full wave power rectifier containing diodes 33 and 34, having anodes connected to opposite end terminals 35 and 36 of winding 24. Diodes 33 and 34 have cathodes connected via common terminal 37 to one input terminal of inductance-capacitance smoothing filter 38. A second input of smoothing filter 32 is connected to common center tap 39 of secondary windings 23 and 24. Smoothing filter 38 derives a DC output voltage which is supplied to main DC load 31 by way of load terminals 41 and 42. The positive DC voltage at terminal 37 is coupled, by way of forward biased diode 45, to measuring circuits 43 which can be used, for example, to determine a power failure of inverter 11. Diode 45 has an anode connected to capacitor 46, to provide a shunt for the input terminals of smoothing filter 38.

The voltage supplied to terminal 15 of inverter 11 is controlled by controller 16 in a well known manner by the voltage across the DC load 31. In addition, in the event of an overcurrent supplied by inverter 11 to winding 23, the inverter is deactivated to prevent self-descruction. To this end, opposite end terminals 47 and 48 of secondary winding 23 are connected to primary windings 49 and 50 of transformer 52 by way of diode rectifiers of 53 and 54. Transformer 52 includes secondary winding 55 which supplies an AC input voltage to bridge rectifier 17 that drives controller 16 with a DC level indicative of the voltage across terminals 47 and 48. Diodes 53 and 54 have cathodes connected to common terminal 37 and anodes respectively connected to windings 49 and 50. The anodes of diodes 33 and 34, as well as diodes 53 and 54, are shunted by separate filter circuits, each of which includes a resistor 57 in series with a capacitor 58.

The circuit described thus far is generally known in the art. It is also known in the art that for such circuits with multiple outputs to be regulated correctly, it is necessary for the power supplied by high frequency switching inverter 11 to power transformer 14 to be above a predetermined minimum value. If the power supplied by inverter 11 is less than this predetermined minimum value, the wave form derived by inverter 11 changes shape and is not coupled to the auxiliary channel including load 26 in such a manner as to enable loads 26 to be properly regulated.

In accordance with the present invention, the minimum power output requirements of inverter 11 to achieve proper regulation of auxiliary loads, e.g. load 26, are maintained by sampling the current in line 61 of main load channel 32 with current transformer 62 including saturating toroidal core 63 and one turn winding 64 about line 61. Core 63 is arranged to saturate in response to the current supplied by main load channel 32 to load 31 being just greater than the minimum load current required for proper operation of inverter 11. A constant, finite amplitude AC voltage is developed across winding 64 when a current just above the predetermined minimum flows in main channel 32 because core 63 is saturated in response to such a current. As the current in main channel 32 increases above the predetermined minimum value, the AC voltage across winding 64 is maintained at the finite constant amplitude because of the saturating characteristics of core 63. In response to the current in line 61 being less than the predetermined minimum value, an AC voltage is developed across winding 64 that is linearly related to the current in line 61.

The magnitude of the voltage across the terminals of winding 64 thus increases in a linear manner as the current in line 61 increases until the minimum current in line 61 necessary for proper operation of inverter 11 is achieved. When the current in line 61 has increased to just above the predetermined minimum necessary for proper operation of inverter 11, the voltage across the terminals of winding 64 becomes constant in amplitude where it remains regardless of increases in amplitude of the current in line 61.

The AC voltage across the terminals of winding 64 is supplied as an input to control module 65, having output terminals connected directly to load terminals 41 and 42 so that the control module is capable of loading main load channel 32. Control module 65 responds to the voltage across winding 64 so that the impedance provided by control module 65 across load terminals 41 and 42 is virtually an open circuit in response to the voltage across winding 64 being the constant voltage associated with core 63 being saturated in response to a current above the minimum predetermined current flowing in line 61. As the current in line 61 drops linearly below the predetermined minimum value therefore, the impedance coupled by control module 65 across load terminals 41 and 42 decreases in a linear manner, to maintain a constant load current in main channel 32.

To these ends, a preferred embodiment for control module 65 is illustrated in FIG. 2 wherein diode bridge rectifier 165 has input terminals coupled to winding 64. Bridge rectifier 165 derives a DC output voltage across a pair of output terminals thereof which are shunted by low pass filter capacitor 66. Capacitor 66 is shunted by resistor 67, having a value which determines the ratio of current to DC voltage across capacitor 66. The voltage developed across the parallel combination of resistor 67 and capacitor 66 is coupled to the base emitter junction of NPN transistor 68 by a resistive voltage divider including series resistor 69 and shunt resistor 70. At the junction or tap between resistors 69 and 70 is developed a DC bias voltage for controlling the emitter collector impedance of transistor 68.

The values of resistors 69 and 70 are chosen so that the base emitter forward bias voltage of transistor 68 of approximately 0.6 volts is just exceeded when the main load current in line 61 reaches the predetermined minimum value for the main channel 32 load current.

In response to the base emitter junction of transistor 68 being forward biased as a result of at least the predetermined minimum current flowing in line 61, the emitter collector path of transistor 68 is turned on, i.e., has a relatively low impedance. For current in line 61 less than the predetermined minimum current required to achieve proper operation of inverter 11, the forward bias voltage applied by resistor 70 to the emitter base junction of transistor 68 reduces the impedance between the emitter and collector of transistor 68 accordingly.

DC power is supplied to the emitter collector path of transistor 68 by the DC voltage developed by channel 32 across load terminals 41 and 42. The positive DC voltage at load terminal 41 is coupled to the collector of transistor 68 by way of resistor 72, having a relatively large resistive value to decouple the impedance variations in the emitter collector path of transistor 68 from load terminals 41 and 42. The emitter collector voltage of transistor 68 is stabilized by filter capacitor 73 shunting the emitter and collector of transistor 68.

In response to the predetermined minimum current flowing in line 61 or a greater current in line 61, the voltage across capacitor 73 is maintained at a predetermined constant value. As the current in line 61 drops below the predetemined minimum current value therefore, the voltage across capacitor 73 decreases accordingly.

The voltage across capacitor 73 is coupled to the base emitter junction of NPN transistor 74, having a variable impedance emitter collector path shunting load terminals 41 and 42. In response to the voltage across capacitor 73 being relatively constant, as subsists when the current in line 61 is at the minimum value or greater necessary to achieve proper operation of inverter 11, the emitter collector path of transistor 74 is turned off, whereby there is virtually no loading by control module 65 of load terminals 41 and 42. As the current in line 61 drops below the predetermined minimum value the forward bias applied by capacitor 73 to the base emitter junction of transistor 74 causes the emitter collector impedance of transistor 74, as coupled to load terminals 41 and 42, to decrease and thereby provide linear loading of terminals 41 and 42 with linear changes in the amplitude of the AC current in line 61.

While there has been described and illustrated one specific embodiment of the invention, it will be clear that variations in the details of the embodiment specifically illustrated and described may be made without departing from the true spirit and scope of the invention as defined in the appended claims.

I claim:

1. A system for supplying plural loads comprising a high frequency switching inverter resonsive to a DC power supply source, said inverter having an output transformer with plural secondary windings and being of a type that must supply a minimum amount of power to said output transformer for proper operation of all said loads, said plural secondary windings being adapted to be connected to said plural loads, one of said secondary windings being connected to a main output channel, said main output channel including a circuit means responsive to said one secondary winding for supplying current to load terminals of said main channel, means responsive to current in the main channel for maintaining the current in the main channel above a predetermined minimum required for proper operation of the other loads, said last named means including a current transformer in a line of the main channel, the current transformer including a saturating core that saturates in response to a main channel current slightly above said predetermined minimum main channel current and a winding means coupled via the saturating core to the main channel current so that there is substantial magnetic coupling via the core between the main channel current and the winding means while the main channel current amplitude is less than the predetermined minimum channel current and there is slight magnetic coupling between the main channel current and the winding means while the main channel current amplitude is greater than the predetermined minimum channel current, and impedance means connected to be responsive to current in the winding means of the current transformer for loading the main channel so that the main channel current is never less than said predetermined minimum main channel current regardless of whether the impedance between the main channel load terminals causes the main channel current to drive the core into saturation or causes the main channel current to be less than the amplitude which drives the core into saturation.

2. The system of claim 1 wherein the winding means of the current transformer and the impedance means are arranged so that as the main channel current drops below said predetermined minimum the loading of the main channel by the impedance means via the magnetic coupling of the core increases accordingly.

3. The system of claim 2 wherein the main channel includes rectifier means for supplying DC to the load terminals thereof, said impedance means including: a rectifier responsive to an output voltage developed across the winding means of said current transformer, circuit means responsive to said rectifier for deriving a DC control voltage, transistor means having output terminals shunting said main channel output terminals, said transistor means being responsive to said DC control voltage so that the impedance of said transistor means between the output terminals thereof is relatively high in response to the main channel current being above the predetermined minimum current and decreases as the main channel current decreases below the predetermined minimum current.

4. The system of claim 3 wherein the transistor means includes first and second transistors, the first transistor having a first emitter collector impedance responsive to the DC control voltage so that the first emitter collector impedance is relatively low and high in response to the main channel current sensed by the current transformer being respectively above and below the predetermined minimum main line current, the second transistor having a second emitter collector impedance responsive to the first emitter collector impedance so that the second emitter collector impedance is relatively high and low in response to the first emitter collector impedance being respectively low and high, the second emitter collector impedance shunting the main channel load terminals.

5. The system of claim 4 wherein the first transistor includes a control electrode for the first emitter collector impedance having the low impedance in response to the control electrode voltage having at least a predetermined value, the current transformer and the core thereof and the circuit means biasing the control electrode to only the predetermined voltage in response to the main channel current sensed by the current transformer being at least equal to the predetermined minimum main channel current.

6. The system of claim 1 wherein the winding means of the current transformer and the impedance means are arranged so that as the main channel current drops in a linear manner below said predetermined minimum the loading of the main channel by the impedance means via the magnetic coupling of the core accordingly increases in a linear manner.

7. The system of claim 6 wherein the main channel includes rectifier means for supplying DC to the load terminals thereof, said impedance means including: a rectifier responsive to an output voltage developed across the winding means of said current transformer, circuit means responsive to said rectifier for deriving a DC control voltage, transistor means having output terminals shunting said main channel output terminals, said transistor means being responsive to said DC control voltage so that the impedance of said transistor means between the output terminals thereof is relatively high in response to the main channel current being above the predetermined minimum current and decreases proportionally with the main channel current as the main channel current decreases below the predetermined minimum current.

8. The system of claim 7 wherein the transistor means includes first and second transistors, the first transistor having a first emitter collector impedance responsive to the DC control voltage so that the first emitter collector impedance is relatively low and high in response to the main channel current sensed by the current tansformer being respectively above and below the predetermined minimum main line current, the second transistor having a second emitter collector impedance responsive to the first emitter collector impedance so that the second emitter collector impedance is relatively high and low in response to the first emitter collector impedance being respectively low and high, the second emitter collector impedance shunting the main channel load terminals.

9. The system of claim 8 wherein the first transistor includes a control electrode for the first emitter collector impedance having the low impedance in response to the control electrode voltage having at least a predetermined value, the current transformer and the core thereof and the circuit means biasing the control electrode to only the predetermined voltage in response to the main channel current sensed by the current transformer being at least equal to the predetermined minimum main channel current.

10. The system of claim 1 wherein the main channel includes rectifier means for supplying DC to the load terminals thereof, said impedance means including: a rectifier responsive to an output voltage developed across the winding means of said current transformer, circuit means responsive to said rectifier for deriving a DC control voltage, transistor means having output terminals shunting said main channel output terminals, said transistor means being responsive to said DC control voltage so that the impedance of said transistor means between the output terminals thereof is relatively high in response to the main channel current being above the predetermined minimum current and decreases as the main channel current decreases below the predetermined minimum current.

11. The system of claim 10 wherein the transistor means includes first and second transistors, the first transistor having a first emitter collector impedance responsive to the DC control voltage so that the first emitter collector impedance is relatively low and high in response to the main channel current sensed by the current tansformer being respectively above and below the predetermined minimum main line current, the second transistor having a second emitter collector impedance responsive to the first emitter collector impedance so that the second emitter collector impedance is relatively high and low in response to the first emitter collector impedance being respectively low and high, the second emitter collector impedance shunting the main channel load terminals.

12. The system of claim 11 wherein the first transistor includes a control electrode for the first emitter collector impedance having the low impedance in response to the control electrode voltage having at least a predetermined value, the current transformer and the core thereof and the circuit means biasing the control electrode to only the predetermiend voltage in response to the main channel current sensed by the current transformer being at least equal to the predetermined minimum main channel current.

13. The system of claim 1 further including means for monitoring the voltage of the main channel load terminals, and means responsive to the monitored voltage for controlling the ouput power of the inverter.

14. The system of claim 13 wherein the current transformer and the impedance means are arranged so that as the main channel current drops in a linear manner below said predetermined minimum the loading of the main channel by the impedance means accordingly increases in a linear manner.

15. The system of claim 14 wherein the main channel includes rectifier means for supplying DC to the load terminals thereof, said impedance means including: a rectifier responsive to an output voltage developed across the winding means of said current transformer, circuit means responsive to said rectifier for deriving a DC control voltage, transistor means having output terminals shunting said main channel output terminals, said transistor means being responsive to said DC control voltage so that the impedance of said transistor means between the output terminals thereof is relatively high in response to the main channel current being above the predetermined minimum current and decreases proportionally with the main channel current as the main channel current decreases below the predetermined minimum current.

16. The system of claim 15 wherein the transistor means includes first and second transistors, the first transistor having a first emitter collector impedance responsive to the DC control voltage so that the first emitter collector impedance is relatively low and high in response to the main channel current sensed by the current transformer being respectively above and below the predetermined minimum main line current, the second transistor having a second emitter collector impedance responsive to the first emitter collector impedance so that the second emitter collector impedance is relatively high and low in response to the first emitter collector impedance being respectively low and high, the second emitter collector impedance shunting the main channel load terminals.

17. The system of claim 16 wherein the first transistor includes a control electrode for the first emitter collector impedance having the low impedance in response to the control electrode voltage having at least a predetermined value, the current transformer and the core thereof and the circuit means biasing the control electrode to only the predetermined voltage in response to the main channel current sensed by the current transformer being at least equal to the predetermined minimum main channel current.

18. The system of claim 13 wherein the main channel includes rectifier means for supplying DC to the load terminals thereof, said impedance means including: a rectifier responsive to an output voltage developed across the winding means of said current transformer, circuit means responsive to said rectifier for deriving a DC control voltage, transistor means having output terminals shunting said main channel output terminals, said transistor means being responsive to said DC control voltage so that the impedance of said transistor means between the output terminals thereof is relatively high in response to the main channel current being above the predetermined minimum current and decreases as the main channel current decreases below the predetermined minimum current.

19. The system of claim 18 wherein the transistor means includes first and second transistors, the first transistor having a first emitter collector impedance responsive to the DC control voltage so that the first emitter collector impedance is relatively low and high in response to the main channel current sensed by the current transformer being respectively above and below the predetermined minimum main line current, the second transistor having a second emitter collector impedance responsive to the first emitter collector impedance so that the second emitter collector impedance is relatively high and low in response to the first emitter collector impedance being respectively low and high, the second emitter collector impedance shunting the main channel load terminals.

20. The system of claim 19 wherein the first transistor includes a control electrode for the first emitter collector impedance having the low impedance in response to the control electrode voltage having at least a predetermined value, the current transformer and the core thereof and the circuit means biasing the control electrode to only the predetermined voltage in response to the main channel current sensed by the current transformer being at least equal to the predetermined minimum main channel current.

21. A system for supplying plural loads comprising a high frequency switching inverter resonsive to a DC power supply source, said inverter having an output transformer with plural secondary windings and being of a type that must supply a minimum amount of power to said output transformer for proper operation of all said loads, said plural secondary windings being adapted to be connected to said plural loads, one of said secondary windings being connected to a main output channel, said main output channel including a circuit means responsive to said one secondary winding for supplying current to load terminals of said main channel, means responsive to current in the main channel for maintaining the current in the main channel above a predetermined minimum required for proper operation of the other loads, said last named means including a current transformer in a line of the main channel, the current transformer including a saturating core that saturates in response to a main channel current slightly above said predetermined minimum main channel current and a winding means coupled via the saturating core to the main channel current, the coupling between the main channel current and the winding means being such that voltage amplitudes induced across the winding means follow current amplitudes in the main channel current while the main channel current amplitude is less than the predetermined minimum channel current and the voltage amplitude induced across the winding means is constant while the main channel current amplitude is greater than the predetermined minimum channel current, and impedance means connected to be responsive to current in the winding means of the current transformer for loading the main channel so that the main channel current is never less than said predetermined minimum main channel current regardless of whether the impedance between the main channel load terminals causes the main channel current to drive the core into saturation or causes the main channel current to be less than the amplitude which drives the core into saturation.

22. The system of claim 21 wherein the voltage amplitudes induced across the second windings are proportional to the main channel current amplitudes while the main channel current amplitude is less than the predetermined minimum channel current.

* * * * *